United States Patent
Kim et al.

(10) Patent No.: US 8,907,597 B2
(45) Date of Patent: Dec. 9, 2014

(54) BATTERY PACK AND ELETRICAL TRANSFER APPARATUS INCLUDING SAME

(75) Inventors: Jin-Wan Kim, Yongin-si (KR);
Jong-Woon Yang, Yongin-si (KR);
Susumu Segawa, Yongin-si (KR);
Eui-Jeong Hwang, Yongin-si (KR);
Se-Sub Sim, Yongin-si (KR); Han-Seok Yun, Yongin-si (KR); Beom-Gyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 758 days.

(21) Appl. No.: 13/020,756

(22) Filed: Feb. 3, 2011

(65) Prior Publication Data
US 2012/0025744 A1    Feb. 2, 2012

(30) Foreign Application Priority Data

Jul. 27, 2010    (KR) ................ 10-2010-0072476

(51) Int. Cl.
*H02P 1/00*    (2006.01)
*H02J 7/00*    (2006.01)
*B60L 11/18*    (2006.01)

(52) U.S. Cl.
CPC .......... *H02J 7/0013* (2013.01); *B60L 11/1853* (2013.01); *H02J 7/0031* (2013.01); *Y02T 10/7005* (2013.01); *Y02T 10/705* (2013.01)
USPC ............ 318/139; 320/124; 320/125; 320/126

(58) Field of Classification Search
CPC ........ Y02E 60/12; H02J 7/0068; H02J 7/022; H02J 7/0073
USPC ................................. 318/139; 320/124–126
See application file for complete search history.

(56) References Cited

U.S. PATENT DOCUMENTS

| | | | |
|---|---|---|---|
| 6,741,065 B1 * | 5/2004 | Ishii et al. ............... | 320/122 |
| 6,781,343 B1 | 8/2004 | Demachi et al. | |

(Continued)

FOREIGN PATENT DOCUMENTS

| | | |
|---|---|---|
| JP | 09-063597 A | 3/1997 |
| JP | 2001-111242 A | 4/2001 |

(Continued)

OTHER PUBLICATIONS

English Machine Translation of JP 2001-111242 A, 37 pages.

(Continued)

*Primary Examiner* — Paul Ip
*Assistant Examiner* — Gabriel Agared
(74) *Attorney, Agent, or Firm* — Christie, Parker & Hale, LLP

(57) ABSTRACT

A battery pack includes: a first battery cell group including at least one high capacity battery cell; and a second battery cell group including at least one high output battery cell and being coupled in parallel to the first battery cell group, wherein the high output battery cell is configured to output a greater current than the high capacity battery cell, the high capacity battery cell is configured to store a greater amount of electric energy compared to the high output battery cell, and the battery pack is configured to operate in one of operational modes including: a high capacity mode for outputting electric energy stored in the first battery cell group; a high output mode for outputting electric energy stored in the second battery cell group; and a mutual charge mode for charging the first battery cell group or the second battery cell group.

14 Claims, 5 Drawing Sheets

(56) References Cited

U.S. PATENT DOCUMENTS

| | | | |
|---|---|---|---|
| 7,679,314 B2* | 3/2010 | Elder et al. | 320/104 |
| 2002/0117998 A1* | 8/2002 | Olsen | 320/135 |
| 2005/0035740 A1* | 2/2005 | Elder et al. | 320/116 |
| 2005/0035741 A1* | 2/2005 | Elder et al. | 320/116 |
| 2008/0048608 A1 | 2/2008 | Lim et al. | |
| 2009/0121663 A1* | 5/2009 | Sejimo | 318/400.04 |

FOREIGN PATENT DOCUMENTS

| | | |
|---|---|---|
| JP | 2004-048913 | 2/2004 |
| JP | 2004-111242 | 4/2004 |
| JP | 2006-079987 A | 3/2006 |
| JP | 3961950 B | 5/2007 |
| JP | 2008-041620 | 2/2008 |
| KR | 10-2007-0076485 A | 7/2007 |
| KR | 10-2007-0083173 A | 8/2007 |
| KR | 10-2008-0017824 A | 2/2008 |
| KR | 10-2008-0043481 | 5/2008 |
| KR | 10-2009-0052520 A | 5/2009 |

OTHER PUBLICATIONS

English Machine Translation of JP 2006-079987 A, 30 pages.
KIPO Registration Determination Certificate, dated Nov. 13, 2011, for KR application No. 10-2010-0072476, 5 pages.
Patent Abstracts of Japan and English Machine Translation of Japanese Publication No. 2004-111242, listed above.

* cited by examiner

BATTERY PACK AND ELETRICAL TRANSFER APPARATUS INCLUDING SAME

CROSS-REFERENCE TO RELATED APPLICATION

This application claims priority to and the benefit of Korean Patent Application No. 10-2010-0072476, filed on Jul. 27, 2010, in the Korean Intellectual Property Office, the disclosure of which is incorporated herein in its entirety by reference.

BACKGROUND

1. Field

One or more embodiments of the present invention relate to a battery pack and an electrical transfer apparatus including the same.

2. Description of the Related Art

As portable electronic devices, for example, mobile phones, digital cameras, laptop computers, and the like, become more widely used, there has been much development of batteries that supply power for operating these portable electronic devices.

A battery in the form of a battery pack includes a battery cell and a protection circuit for controlling charging and discharging of the battery cell, and may be classified as a lithium ion (Li-ion) battery, a nickel cadmium (Ni—Cd) battery, and the like according to the type of the battery cell. Such a battery cell may be a secondary battery, which may be rechargeable.

On the other hand, as the problem of environmental pollution is getting worse, there has been increased interest in green technology. Due to an increase in the interest in green technology, there has recently been increased interest in electric bicycles.

Electric bicycles are driven by turning the wheels using an electric motor. The motor is driven by electricity supplied from a battery, and thus battery capacity is very important. Recently, battery capacity has been increasing due to the advancement of secondary battery related technology.

SUMMARY

Aspects of embodiments of the present invention are directed toward a battery pack that allows efficient use of electric energy stored therein and an electrical transfer apparatus including the battery pack.

Additional aspects will be set forth in part in the description which follows and, in part, will be apparent from the description, or may be learned by practice of the presented embodiments.

According to one or more embodiments of the present invention, a battery pack includes: a first battery cell group including at least one high capacity battery cell; and a second battery cell group including at least one high output battery cell and being coupled in parallel to the first battery cell group, wherein the high output battery cell is configured to output a greater current than the high capacity battery cell, the high capacity battery cell is configured to store a greater amount of electric energy compared to the high output battery cell, and the battery pack is configured to operate in one of operational modes including: a high capacity mode for outputting electric energy stored in the first battery cell group; a high output mode for outputting electric energy stored in the second battery cell group; and a mutual charge mode for charging the first battery cell group or the second battery cell group.

In the mutual charge mode, the first battery cell group and the second battery cell group may be enabled to be mutually charged.

The battery pack may further include a battery management unit for determining a state of charge (SOC) of the first battery cell group and the second battery cell group.

When the SOC of the first battery cell group or the second battery cell group is below a reference value, the first battery cell group or the second battery cell group may be charged.

The battery pack may further include a charge circuit unit coupled between the first battery cell group and the second battery cell group.

The charge circuit unit may include a first switching device for controlling a current flowing in the second battery cell group.

The charge circuit unit may further include a second switching device for controlling a current flowing in the first battery cell group.

The battery pack may be configured to operate in the mutual charge mode when the electric energy stored in the first battery cell group or the second battery cell group is not output to the outside of the battery pack.

According to one or more embodiments of the present invention, an electrical transfer apparatus includes: a wheel; an electric motor for driving the wheel; and a battery pack for applying electric energy to the electric motor, wherein the battery pack includes: a first battery cell group including at least one high capacity battery cell; and a second battery cell group including at least one high output battery cell and being coupled in parallel to the first battery cell group, the high output battery cell is configured to output a greater current than the high capacity battery cell, the high capacity battery cell is configured to store a greater amount of electric energy compared to the high output battery cell, and the battery pack is configured to operate in one of operational modes comprising: a high capacity mode for outputting electric energy stored in the first battery cell group; a high output mode for outputting electric energy stored in the second battery cell group; and a mutual charge mode for charging the first battery cell group or the second battery cell group.

The electrical transfer apparatus may be configured to operate in one of operational modes including: an auto mode for driving the wheel by using electric energy stored in the battery pack; an assist mode for driving the wheel by using electric energy stored in the battery pack and torque applied from a user; and a passive mode for driving the wheel by using only torque applied from the user.

The battery pack may be configured to operate in the mutual charge mode in the passive mode of the electrical transfer apparatus.

In the mutual charge mode, the first battery cell group and the second battery cell group in the battery pack may be enabled to be mutually charged.

The battery pack may further include a battery management unit for determining a state of charge (SOC) of the first battery cell group and the second battery cell group.

When the SOC of the first battery cell group or the second battery cell group is below a reference value, the first battery cell group or the second battery cell group may be charged.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
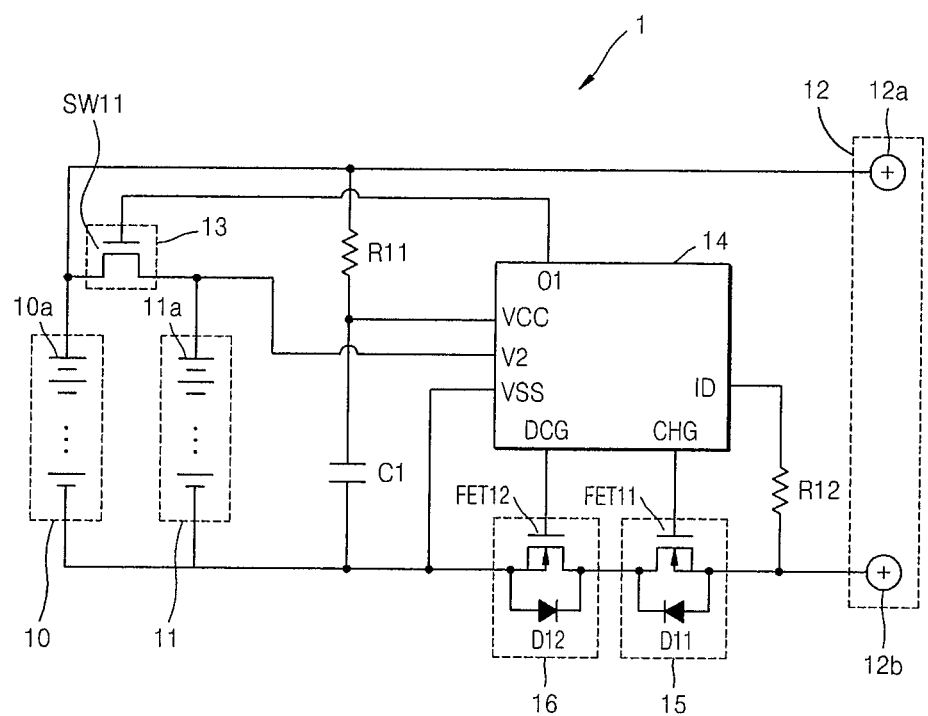
FIG. 1 is a circuit diagram of a battery pack, according to an embodiment of the present invention.

Hereinafter, exemplary embodiments of the present invention will be described more fully with reference to the accompanying drawings. In the drawings, like reference numerals denote like elements, and thus detailed descriptions will not be repeated.

In the description, detailed descriptions needed to understand the embodiments of the present invention are provided, and others may be omitted so as not to hinder the understanding of the present invention. The terminology used herein may be construed as consistent with a technical idea of the present invention as illustrated in the specification.

FIG. 1 is a circuit diagram of a battery pack 1, according to an embodiment of the present invention.

Referring to FIG. 1, the battery pack 1 according to an embodiment of the present invention includes a high-capacity battery cell group 10, a high output battery cell group 11, a terminal unit 12, a charge circuit unit 13, a battery management system (BMS) 14, a charge control switch 15, and a discharge control switch 16.

The high-capacity battery cell group 10 may include one or more high-capacity battery cells 10a. One electrode of the high-capacity battery cell group 10 is coupled to the charge circuit unit 13 and the other electrode of the high-capacity battery cell group 10 is coupled to the terminal unit 12 through the charge control switch 15 and the discharge control switch 16. The high-capacity battery cell 10a stores a relatively greater amount of electric energy than a high output battery cell 11a, which will be described later in more detail, and has a relatively low current output value compared to the high output battery cell 11a. The high-capacity battery cell 10a may include a positive electrode, a negative electrode, and a separator and may be a secondary battery that may be rechargeable. In one embodiment, a lithium nickel based complex oxide may be used as a positive active material and a graphite-based carbon may be used as a negative active material in the high-capacity battery cell 10a. However, the positive active material and negative active material of the high-capacity battery cell 10a are not limited thereto in the present invention.

The high output battery cell group 11 is coupled in parallel to the high-capacity battery cell group 10 and may include one or more high output battery cells 11a. One electrode of the high output battery cell group 11 is coupled to the charge circuit unit 13, and the other electrode of the high output battery cell group 11 is coupled to the terminal unit 12 through the charge control switch 15 and the discharge control switch 16. The high output battery cell 11a has a relatively greater current output value compared to the high-capacity battery cell 10a and stores a relatively small amount of electric energy compared to the high-capacity battery cell 10a.

The high output battery cell 11a may include a positive electrode, a negative electrode, and a separator and may be a secondary battery that may be rechargeable. In one embodiment, a lithium•manganese based complex oxide may be used as a positive active material and an amorphous-based carbon may be used as a negative active material in the high output battery cell 11a. However, the positive active material and the negative active material of the high output battery cell 11a are not limited thereto in the present invention.

When the battery pack 1 is coupled to an external device, the high-capacity battery cell group 10 and the high output battery cell group 11 perform charging or discharging. In particular, when the external device is a device using electric energy stored in the battery pack 1, either the high capacity battery cell group 10 or high output battery cell group 11 may be selected or both the high capacity battery cell group 10 and the high output battery cell group 11 may perform discharging.

The terminal unit 12 is coupled to a charging device or an external device. The external device may be a load such as a mobile phone, a laptop computer, or an electric bicycle which uses electric energy of the battery pack 1. The terminal unit 12 includes a positive electrode terminal 12a and a negative electrode terminal 12b. When a charging device is coupled to the terminal unit 12, a current flows in through the positive electrode terminal 12a and a current flows out through the negative electrode terminal 12b, thereby charging the battery pack 1. Alternately, when an external device is coupled to the terminal unit 12, a current flows out through the positive electrode terminal 12a and a current flows in through the negative electrode terminal 12b, thereby discharging the battery pack 1.

In the battery pack 1 according to an embodiment of the present invention, charging and discharging may be performed between the high-capacity battery cell group 10 and the high output battery cell group 11. In this regard, the charge circuit unit 13 is located between the high-capacity battery cell group 10 and the high output battery cell group 11. The charge circuit unit 13 may charge the high output battery cells 11a of the high output battery cell group 11 by using electric energy stored in the high-capacity battery cell group 10 according to control of the BMS 14. Also, the charge circuit unit 13 may charge the high-capacity battery cells 10a of the high-capacity battery cell group 10 by using electric energy stored in the high output battery cell group 11 according to control of the BMS 14.

The charge circuit unit 13 may include a first switching device SW11 in order to control a current flowing between the high-capacity battery cell group 10 and the high output battery cell group 11. A first electrode of the first switching device SW11 is coupled to one electrode of the high-capacity battery cell group 10, and a second electrode of the first switching device SW11 is coupled to one electrode of the high output battery cell group 11. A control signal from the BMS 14 is applied to a control signal input of the first switching device SW11, thereby controlling a current flowing between the first electrode and the second electrode of the first switching device SW11.

The first switching device SW11 may be an N-type metal oxide semiconductor (NMOS) transistor, and a control electrode of the first switching device SW11 may be a gate electrode. Also, the first electrode and the second electrode may be a source electrode and a drain electrode, respectively, or vice versa. In one embodiment, the first switching device SW11 is an NMOS transistor, however, the present invention is not limited thereto. The first switching device SW11 may be any suitable switching device that may control a current flowing between the high-capacity battery cell group 10 and the high output battery cell group 11. Also, the charge circuit unit 13 according to an embodiment of the present invention usually turns off the first switching device SW11 to apply electric energy of the high-capacity battery cell group 10. When high output is needed, the charge circuit unit 13 turns on the first switching device SW11 to concurrently (e.g., simultaneously) apply electric energy of the high-capacity battery cell group 10 and the high output battery cell group 11. However, the present invention is not limited thereto.

The BMS 14 controls the entire operation of the battery pack 1 and performs the overall control for charging and discharging of the high-capacity battery cell group 10 and the high output battery cell group 11. The BMS 14 senses a charging/discharging state of the high-capacity battery cell group 10 and the high output battery cell group 11 and a current flowing state of the battery pack 1, and generates a charge control signal and a discharge control signal, according to a result of sensing. The BMS 14 outputs the generated charge control signal and discharge control signal through a charge control terminal CHG and a discharge control terminal DCG, respectively.

A VCC terminal of the BMS 14 is coupled to a node between a resistor R11 and a capacitor C1 that are coupled in series between two terminals of the high-capacity battery cell group 10. A VSS terminal of the BMS 14 is coupled to one terminal of the high-capacity battery cell group 10. A V2 terminal of the BMS 14 is coupled to one terminal of the high output battery cell group 11. Voltage applied through the VCC terminal may be used as a power source of the BMS 14. The BMS 14 may measure voltage of the high-capacity battery cell group 10 through the voltage applied through the VCC terminal and may measure voltage of the high output battery cell group 11 through voltage applied through the V2 terminal. Also, an ID terminal of the BMS 14 is coupled to a resistor R12, which may be used to sense whether excessive current flows in the battery pack 1. Input terminals and output terminals of the BMS 14 are not limited thereto. Also, in one embodiment, the BMS 14 senses an internal state of the battery pack 1. However, the present invention is not limited thereto, and an analog front end may sense voltages of the high-capacity battery cell group 10 and the high output battery cell group 11 to output one or more digital signals and the BMS 14 may control the operation of the battery pack 1 by using the one or more digital signals output from the analog front end.

The BMS 14, according to one embodiment, may control an operation mode of the battery pack 1 to be a high capacity mode, a high output mode, a mutual charge mode, an idle mode, or a general charge mode.

In the high capacity mode, electric energy stored in the high-capacity battery cell group 10 is output to an external device. The high capacity mode may be applied when an external device needs a relatively small current. For example, when an electric bicycle moves on level ground, the BMS 14 controls the battery pack 1 in the high capacity mode and applies electric energy stored in the high-capacity battery cell group 10 to the electric bicycle.

In the high output mode, electric energy stored in the high output battery cell group 11 is output to an external device. The high output mode may be applied when an external device needs a relatively large current. For example, when the electric bicycle starts to move or climbs a hill, the BMS 14 controls the battery pack 1 in the high output mode and applies electric energy stored in the high output battery cell group 11 to the electric bicycle.

In the mutual charge mode, electric energy is exchanged between the high-capacity battery cell group 10 and the high output battery cell group 11 when electric energy is not output from the battery pack 1 to an external device. The BMS 14 in the mutual charge mode controls the charge circuit unit 13 according to the result of sensing a charge state of the high-capacity battery cell group 10 and the high output battery cell group 11. More specifically, the BMS 14 determines whether a state of charge (SOC) of the high-capacity battery cell group 10 and/or the high output battery cell group 11 is below a reference value and performs the mutual charge mode when a SOC of at least one of the high-capacity battery cell group 10 and the high output battery cell group 11 is below the reference value. In a secondary battery, as the number of times charging and discharging occurs increases, the lifetime thereof may be reduced. Accordingly, the mutual charge mode may be operated only when the SOC is below the reference value. For example, when the SOC of the high-capacity battery cell group 10 and/or the high output battery cell group 11 is 95% or below, compared with fully charged, the mutual charge mode may be operated.

Here, the voltages of the high-capacity battery cell group 10 and the high output battery cell group 11 are measured, and electric energy is applied from a battery cell group having a relatively higher voltage to a battery cell group having a relatively lower voltage. In one embodiment, when the SOC of at least one of the high-capacity battery cell group 10 and the high output battery cell group 11 is below the reference value, the BMS 14 applies a high-level signal to the charge circuit unit 13 through a first output terminal O1 so as to turn the first switching device SW11 on. Accordingly, a current flows from a battery cell group having a relatively higher voltage to a battery cell group having a relatively lower voltage, and thus electric energy may be exchanged between the high-capacity battery cell group 10 and the high output battery cell group 11.

When the SOC of both the high-capacity battery cell group 10 and the high output battery cell group 11 exceeds a reference value and there is no need to supply electric energy to an external device, the battery pack 1 may be operated in an idle mode in which a charging and discharging operation is not performed. Also, when the terminal unit 12 is coupled to a charging device, both the high-capacity battery cell group 10 and the high output battery cell group 11 may be operated in a general charge mode in which a charging operation is performed.

The charge control switch 15 and the discharge control switch 16 are each formed of a field effect transistor (FET) and a parasitic diode. That is, the charge control switch 15 is formed of a FET11 and a parasitic diode D11, and the discharge control switch 16 is formed of a FET12 and a parasitic diode D12. A connection direction between a source and a drain of the FET11 of the charge control switch 15 is the opposite of a connection direction between a source and a drain of the FET12 of the discharge control switch 16. In this regard, the FET11 of the charge control switch 15 is coupled to limit a current flowing to the terminal unit 12 from the high-capacity battery cell group 10 and the high output battery cell group 11, and the FET12 of the discharge control switch 16 is coupled to limit a current flowing from the terminal unit 12 to the high-capacity battery cell group 10 and the high output battery cell group 11. Here, the FET11 and the FET12 of the charge control switch 15 and the discharge control switch 16, respectively, are switching devices. However, the present invention is not limited thereto, and the FET11 and the FET12 may be any suitable electric device that performs switching function. Also, the parasitic diodes D11 and D12 included in the charge control switch 15 and the discharge control switch 16, respectively, are formed to allow a current to flow in a direction opposite a current flow direction that is limited by the FET11 and FET12.

The battery pack 1 according to an embodiment of the present invention includes both the high-capacity battery cell group 10 and the high output battery cell group 11 so as to selectively adjust a current output according to a demand of an external device. Also, electric energy may be exchanged between the high-capacity battery cell group 10 and the high output battery cell group 11, and thus electric energy may be efficiently utilized.

Figure 2:
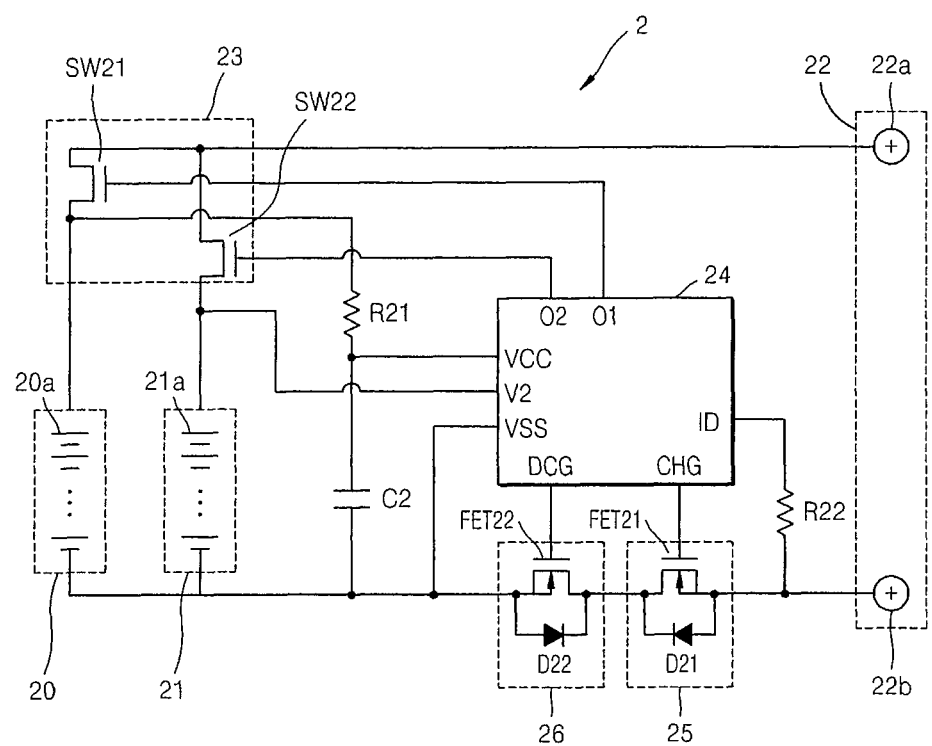
FIG. 2 is a circuit diagram of a battery pack, according to another embodiment of the present invention.

FIG. 2 is a circuit diagram of a battery pack 2, according to another embodiment of the present invention. The battery pack 2 is similar in terms of structure and function to the battery pack 1 of FIG. 2, and thus only their differences will be described.

Referring to FIG. 2, the battery pack 2 according to one embodiment includes a high-capacity battery cell group 20, a high output battery cell group 21, a terminal unit 22, a charge circuit unit 23, a BMS 24, a charge control switch 25, and a discharge control switch 26.

The charge circuit unit 23 may charge high output battery cells 21a of the high output battery cell group 21 by using electric energy stored in the high-capacity battery cell group 20 according to control of the BMS 24. Also, the charge circuit unit 23 may charge high-capacity battery cells 20a of the high-capacity battery cell group 20 by using electric energy stored in the high output battery cell group 21 according to control of the BMS 24.

The charge circuit unit 23 may include a first switching device SW21 and a second switching device SW22 in order to control a current flowing between the high-capacity battery cell group 20 and the high output battery cell group 21.

A first electrode of the first switching device SW21 is coupled to one electrode of the high-capacity battery cell group 20, and a second electrode of the first switching device SW21 is coupled to a positive electrode terminal 22a. A first electrode of the second switching device SW22 is coupled to one electrode of the high output battery cell group 21, and a second electrode of the second switching device SW22 is coupled to the positive electrode terminal 22a. A control signal from the BMS 24 is applied to the first switching device SW21 and the second switching device SW22, and thus a current flowing between the first electrode and the second electrode may be controlled.

The first switching device SW21 and the second switching device SW22 may each be an NMOS transistor, and a control electrode may be a gate electrode. The first electrode and the second electrode may be a source electrode and a drain electrode, respectively, or vice versa. In one embodiment, the first switching device SW21 and the second switching device SW22 are each an NMOS transistor. However, the present invention is not limited thereto. The first switching device SW21 and the second switching device SW22 may be any suitable switching device that can control a current flowing between the high-capacity battery cell group 20 and the high output battery cell group 21.

In one embodiment, the BMS 24 applies a control signal to the first switching device SW21 of the charge circuit unit 23 through a first output terminal O1 in a high capacity mode so as to turn the first switching device SW21 on, and thus electric energy of the high-capacity battery cell group 20 is supplied to an external device.

Also, the BMS 24 applies a control signal to the second switching device SW22 of the charge circuit unit 23 through a second output terminal O2 in a high output mode so as to turn the second switching device SW22 on, and thus electric energy of the high output battery cell group 21 is supplied to the external device.

Moreover, the BMS 24 controls the charge circuit unit 23 according to a result of sensing a SOC of the high-capacity battery cell group 20 and the high output battery cell group 21 in a mutual charge mode. More specifically, the BMS 24 determines whether a SOC of the high-capacity battery cell group 20 and the high output battery cell group 21 is below a reference value. When it is determined that the SOC of at least one of the high-capacity battery cell group 20 or the high output battery cell group 21 is below the reference value, the BMS 24 turns the first switching device SW21 and the second switching device SW22 on, and thus electric energy may be exchanged between the high-capacity battery cell group 20 and the high output battery cell group 21.

The battery pack 2, according to an embodiment of the present invention, includes both the high-capacity battery cell group 20 and the high output battery cell group 21 so as to selectively adjust a current output according to a demand of an external device. Also, electric energy may be exchanged between the high-capacity battery cell group 20 and the high output battery cell group 21, and thus the electric energy of the battery pack 2 may be efficiently applied.

Figure 3:
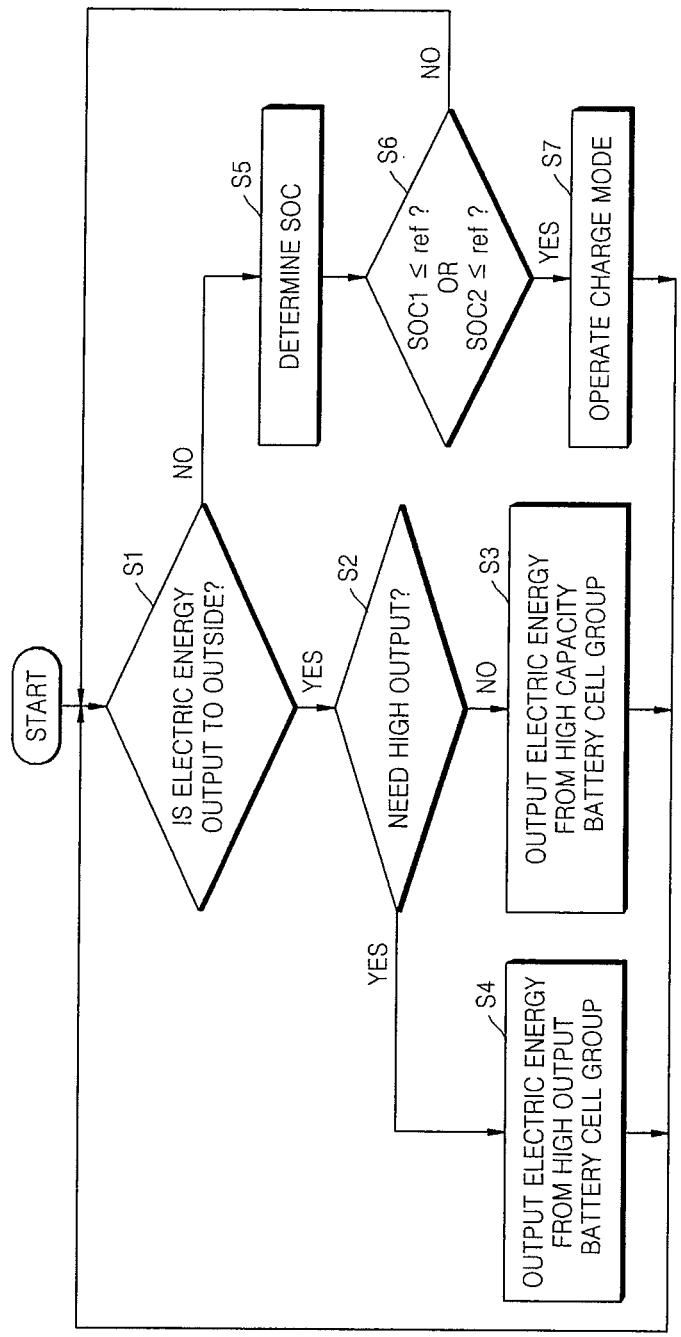
FIG. 3 is a flowchart illustrating a method of controlling the battery pack of FIG. 1 or FIG. 2, according to an embodiment of the present invention.
Figure 4:
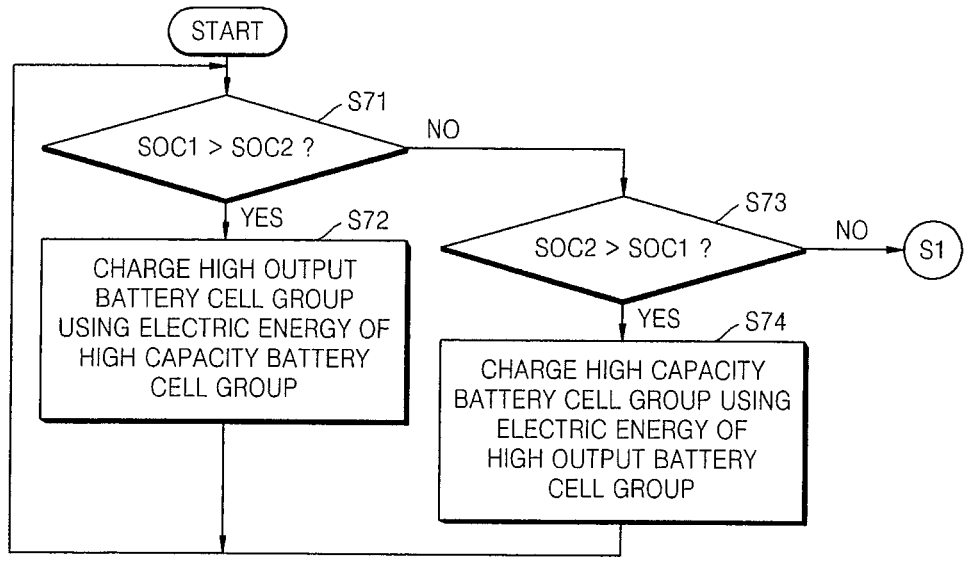
FIG. 4 is a flowchart illustrating a method of operating the battery pack of FIG. 1 or FIG. 2 in a mutual charge mode, according to an embodiment of the present invention.

FIG. 3 is a flowchart illustrating a method of controlling the battery pack 1 or 2, according to an embodiment of the present invention, and FIG. 4 is a flowchart illustrating a method of operating the battery pack 1 or 2 in a mutual charge mode, according to an embodiment of the present invention.

Referring to FIG. 3, the BMS 14 or 24 determines whether electric energy is output to the outside from the battery pack 1 or 2, in operation S1. When electric energy is output to the outside, whether high output is needed is determined, in operation S2. For example, whether or not an electric bicycle moves on a level ground or climbs a hill is determined.

When it is determined that high output is not needed, in operation S2, the BMS 14 or 24 is operated in a high capacity mode to output electric energy stored in the high-capacity battery cell group 10 or 20 to the outside, in operation S3. When it is determined that high output is needed, in operation S2, the BMS 14 or 24 is operated in a high output mode so as to output electric energy stored in the high output battery cell group 11 or 21 to the outside, in operation S4. Then, the BMS 14 or 24 repeatedly determines whether the battery pack 1 or 2 transmits electric energy to the outside.

When it is determined that electric energy is not output to the outside from the battery pack 1 or 2, in operation S1, the BMS 14 or 24 determines a SOC1 or a SOC2 of the high-capacity battery cell group 10 or 20 and the high output battery cell group 11 or 21, respectively, in operation S5. Whether or not the SOC1 of the high-capacity battery cell group 10 or 20 and/or the SOC2 of the high output battery cell group 11 or 21 is below a reference value ref is determined, in operation S6.

When a SOC of at least one of the battery cell groups is below the reference value ref, the BMS 14 or 24 operates in a mutual charge mode, in operation S7. When a SOC of the high-capacity battery cell group 10 or 20 and the high output battery cell group 11 or 21 exceeds the reference value ref, a mutual charge mode is not performed and operation S1 is performed. In this case, as both the high-capacity battery cell group 10 or 20 and the high output battery cell group 11 or 21 are fully charged, an additional charging operation is not needed.

Hereinafter, the mutual charge mode will be described in more detail.

Referring to FIG. 4, in the mutual charge mode in operation S7 of FIG. 3, the BMS 14 or 24 compares the SOC1 and the SOC2, in operations S71 and S73. When the SOC1 is greater than the SOC2, the high output battery cell group 11 or 21 needs to be charged and thus is charged using electric energy of the high-capacity battery cell group 10 or 20, in operation S72. When the SOC2 is greater than the SOC1, the high-capacity battery cell group 10 or 20 needs to be charged and thus is charged using electric energy of the high output battery cell group 11 or 21, in operation S74. When the values of the SOC1 and the SOC2 are the same as each other and even if the SOC1 and the SOC2 are below a reference value, electric energy may not be exchanged between the high-capacity battery cell group 10 or 20 and the high output battery cell group 11 or 21. In this regard, when the values of the SOC1 and the SOC2 are the same as each other, the mutual charge mode is not performed and operation S1 is performed.

In the method of controlling the battery pack 1 or 2 according to an embodiment of the present invention, a high capacity mode, a high output mode, or a mutual charge mode is performed so as to efficiently apply electric energy of the battery pack 1 or 2.

Figure 5:
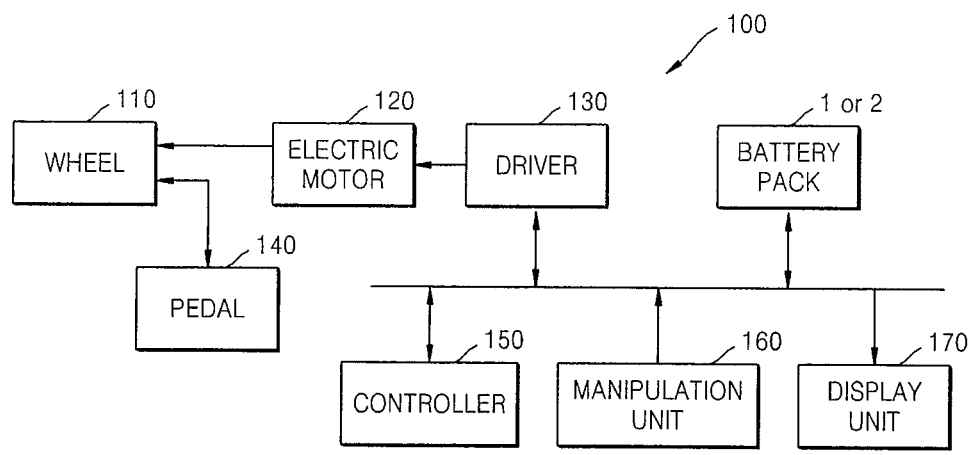
FIG. 5 is a block diagram of an electrical transfer apparatus, according to an embodiment of the present invention.

FIG. 5 is a block diagram of an electrical transfer apparatus 100, according to an embodiment of the present invention.

Referring to FIG. 5, the electrical transfer apparatus 100 according to the current embodiment of the present invention may include the battery pack 1 or 2, a wheel 110, an electric motor 120, a driver 130, a pedal 140, a controller 150, a manipulation unit 160, and a display unit 170.

The battery pack 1 or 2 described with reference to FIG. 1 or FIG. 2 may be used, and a detailed description thereof will be omitted here.

The wheel 110 allows the electrical transfer apparatus 100 to move by using power transmitted from the electric motor 120 or the pedal 140.

The electric motor 120 rotates and moves the wheel 110 forward according to a driving signal of the driver 130. The electric motor 120 is driven by receiving electric energy from the battery pack 1 or 2. The electric motor 120 is directly connected to the wheel 110 so as to drive the wheel 110. Also, the electric motor 120 may drive the wheel 110 through a connection of a chain, a gear, or the like.

The driver 130 receives a control signal from the controller 150, generates a driving signal for driving the electric motor 120, and applies the generated driving signal to the electric motor 120. The driving signal may vary according to an operational mode of the electrical transfer apparatus 100.

The pedal 140 transmits power supplied from a user to the wheel 110. Torque applied by the pedal 140 is transmitted to the wheel 110 so as to move the electrical transfer apparatus 100 forward.

The controller 150 controls the entire operation of the electrical transfer apparatus 100. The controller 150 receives residual quantity information (e.g., remaining charge) of the battery pack 1 or 2 from the battery pack 1 or 2, and the received information may be displayed on the display unit 170.

The electrical transfer apparatus 100 has a plurality of operational modes and may be operated in any one of the operational modes. For example, the electrical transfer apparatus 100 may operate in an auto mode and an assist mode. In the auto mode, the wheel 110 is driven only by using electric energy stored in the battery pack 1 or 2, and in the assist mode, the wheel 110 is driven by using electric energy stored in the battery pack 1 or 2 and torque applied from a user. Also, the electrical transfer apparatus 100 may operate in a passive mode for driving the wheel 110 by using only torque applied from a user.

When electric energy is not output to the electrical transfer apparatus 100, the battery pack 1 or 2 may operate a mutual charge mode. In this regard, when the electrical transfer apparatus 100 is in a passive mode, the battery pack 1 or 2 may operate in a mutual charge mode.

In the electrical transfer apparatus 100, an amount of current drawn by the electrical transfer apparatus 100 may vary according to a traveling state in the same operational mode.

TABLE 1

| Traveling state | Discharge current (A) | Discharge output (W) |
| --- | --- | --- |
| Start | 15~20 | 360~480 |
| Traveling on level ground | 5~10 | 130~260 |
| Traveling uphill road | 13 | 325 |
| Traveling downhill road | 8 | 210 |

Table 1 shows the amount of current and power drawn by the electrical transfer apparatus 100 according to various traveling states.

Referring to Table 1, in traveling a downhill road or level ground, a relatively small discharge current and discharge output are required compared with starting or traveling an uphill road. Accordingly, when the electrical transfer apparatus 100 travels a downhill road or level ground, the battery pack 1 or 2 operates in a high capacity mode and outputs electric energy stored in the high-capacity battery cell group 10 or 20 to operate the electrical transfer apparatus 100. When the electrical transfer apparatus 100 travels an uphill road or starts, the battery pack 1 or 2 operates in a high output mode and outputs electric energy stored in the high output battery cell group 11 or 21 to operate the electrical transfer apparatus 100.

The manipulation unit 160 applies a manipulation signal to the controller 150 according to input of a user. The user may apply various command signals or select an operational mode by using the manipulation unit 160.

The display unit 170 displays various information transmitted from the controller 150 to a user. For example, the display unit 170 may display residual quantity information of the battery pack 1 or 2 or operational mode information. The display unit 170 may include a display panel such as a liquid crystal display (LCD) or an organic light emitting display (OLED), and a driver thereof.

Figure 6:
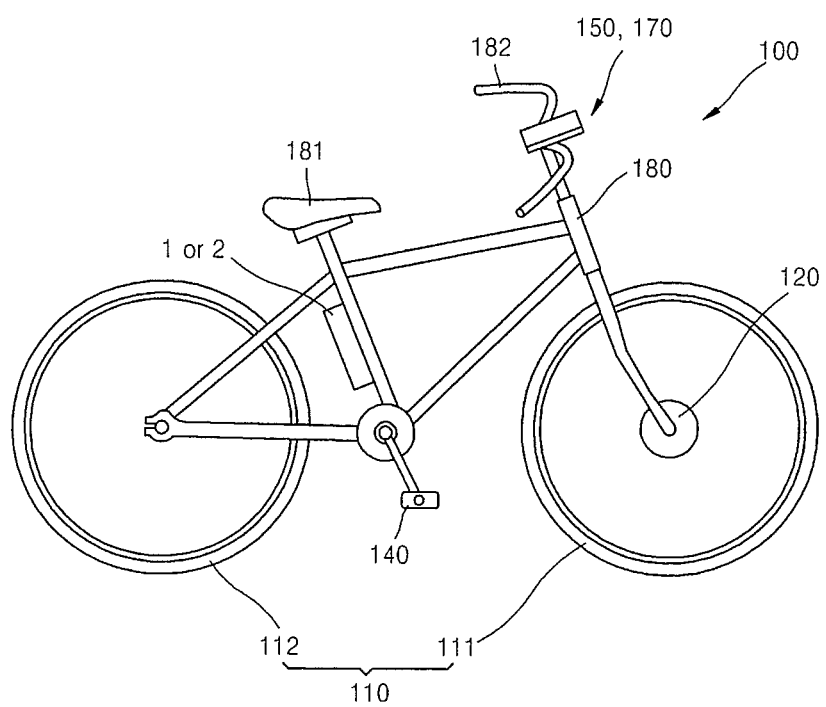
FIG. 6 is a drawing of an electric bicycle as an example of using the electrical transfer apparatus of FIG. 5.

FIG. 6 is a drawing of an electric bicycle as an example of using the electrical transfer apparatus 100 of FIG. 5.

Referring to FIG. 6, a frame 180 supports each element of the electric bicycle and functions as an overall framework. Also, the frame 180 allows the weight of a user to be uniformly applied to the wheels 110.

The wheels 110, the battery pack 1 or 2, the electric motor 120, the pedal 140, the controller 150, the display unit 170, a saddle 181, and a handle 182 are installed on the frame 180.

The wheels 110 may include a front wheel 111 and a rear wheel 112. The number of wheels 110 is not limited thereto and three or more wheels may be included.

The saddle 181 allows a user to mount the electric bicycle, and the handle 182 allows a user to control a traveling direction of the electric bicycle and to support the user's body.

The controller 150 and the display unit 170 may be integrally formed with each other as a single body on the frame 180, and the manipulation unit 160 may also be installed on the frame 180.

In FIG. 6, the electric bicycle is illustrated as the electrical transfer apparatus 100. However, the present invention is not limited thereto, and the electrical transfer apparatus 100 according to the present invention may be any suitable transfer apparatus, for example, a hybrid car, operated by using electric energy.

The electrical transfer apparatus 100 according to an embodiment of the present invention may receive an appropriate output current according to an operational state of the electrical transfer apparatus 100 by using the battery pack 1 or 2 including both the high-capacity battery cell group 10 or 20 and the high output battery cell group 11 or 21. Also, as electric energy may be exchanged between the high-capacity battery cell group 10 or 20 and the high output battery cell group 11 or 21, electric energy stored in the battery pack 1 or 2 may be efficiently used.

A program for executing the method of controlling the battery pack 1 or 2 or the electrical transfer apparatus 100 may be stored in a recording medium, according to an embodiment of the present invention. The recording medium may be, for example, a computing processor readable medium and may include a semiconductor recording medium (for example, a flash memory). The medium may be read by a processor and may be executed in a processor.

It should be understood that the exemplary embodiments described herein should be considered in a descriptive sense only and not for purposes of limitation. Descriptions of features or aspects within each embodiment should typically be considered as available for other similar features or aspects in other embodiments.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
a first battery cell group comprising at least one high capacity battery cell; and
a second battery cell group comprising at least one high output battery cell and being coupled in parallel to the first battery cell group,
wherein the high output battery cell is configured to have a relatively greater current output value in comparison to the high capacity battery cell to output a greater current than the high capacity battery cell, the high capacity battery cell has a capacity to store a greater amount of electric energy compared to the high output battery cell, and
wherein the battery pack further comprises:
a battery management system configured to operate in one of operational modes comprising:
a high capacity mode for outputting electric energy stored in the first battery cell group;
a high output mode for outputting electric energy stored in the second battery cell group;
an idle mode in which a charging and discharging operation is not performed when both a charge of the first battery cell group and a charge of the second battery cell group is greater than a reference value; and
a mutual charge mode for charging the first battery ceil group or the second battery cell group when the charge of the first battery cell group or the charge of the second battery cell group is less than the reference value.

2. The battery pack of claim 1, wherein in the mutual charge mode, the first battery cell group and the second battery cell group are enabled to be mutually charged.

3. The battery pack of claim 2, further comprising a battery management unit for determining a state &charge (SOC) of the first battery cell group and the second battery cell group.

4. The battery pack of claim 3, wherein when the SOC of the first battery cell group or the second battery cell group is below a reference value, the first battery cell group or the second battery cell group is charged.

5. The battery pack of claim 3, further comprising a charge circuit unit coupled between the first battery cell group and the second battery ceil group.

6. The battery pack of claim 5, wherein the charge circuit unit comprises a first switching device for controlling a current flowing in the second battery cell group.

7. The battery pack of claim 6, wherein the charge circuit unit further comprises a second switching device for controlling a current flowing in the first battery cell group.

8. The battery pack of claim 1, wherein the battery pack is configured to operate in the mutual charge mode when the electric energy stored in the first battery cell group or the second battery cell group is not output to the outside of the battery pack.

9. An electrical transfer apparatus comprising:
a wheel;
an electric motor for driving the wheel; and
a battery pack for applying electric energy to the electric motor,
wherein the battery pack comprises:
a first battery cell group comprising at least one high capacity battery cell; and
a second battery cell group comprising at least at least one high output battery cell and being coupled in parallel to the first battery cell group, the high output battery cell is configured to have a relatively greater current output value in comparison to the high capacity battery cell to output a greater current than the high capacity battery cell, the high capacity battery cell has a capacity to store a greater amount of electric energy compared to the high output battery cell, and
wherein the battery pack further comprises:
a battery management system configured to operate in one of operational modes comprising:
a high capacity mode for outputting electric energy stored in the first battery cell group;
a high output mode for outputting electric energy stored in the second battery cell group;
an idle mode in which a charging and discharging operation is not performed when both a charge of the first battery cell group and a charge of the second battery cell group is greater than a reference value; and
a mutual charge mode for charging the first battery cell group or the second battery cell group when the charge of the first battery cell group or the charge of the second battery cell group is less than the reference value.

10. The electrical transfer apparatus of claim 9, wherein the electrical transfer apparatus is configured to operate in one of operational modes comprising: an auto mode for driving the wheel by using electric energy stored in the battery pack; an assist mode for driving the wheel by using electric energy stored in the battery pack and torque applied from a user; and a passive mode for driving the wheel by using only the torque applied from the user.

11. The electrical transfer apparatus of claim 10, wherein the battery pack is configured to operate in the mutual charge mode in the passive mode of the electrical transfer apparatus.

12. The electrical transfer apparatus of claim 11, wherein in the mutual charge mode, the first battery cell group and the second battery cell group in the battery pack are enabled to be mutually charged.

13. The electrical transfer apparatus of claim 9, wherein the battery pack further comprises a battery management unit for determining a state of charge (SOC) of the first battery cell group and the second battery cell group.

14. The electrical transfer apparatus of claim 13, wherein when the SOC of the first battery cell group or the second battery ceil group is below a reference value, the first battery cell group or the second battery cell group is charged.

* * * * *